United States Patent [19]
Takahata et al.

[11] 3,844,723
[45] Oct. 29, 1974

[54] MULTI-STAGE COUNTER-CURRENT LIQUID-LIQUID CONTACT APPARATUS

[75] Inventors: Shigeru Takahata; Mitsuhiro Suemura; Masaru Noguchi; Kenji Ohdan, all of Takefu, Japan

[73] Assignee: Shinetsu Chemical Company, Tokyo, Japan

[22] Filed: July 3, 1972

[21] Appl. No.: 268,713

Related U.S. Application Data

[63] Continuation of Ser. No. 24,991, April 2, 1970, abandoned.

[30] Foreign Application Priority Data
Apr. 14, 1969 Japan.............................. 44-29185

[52] U.S. Cl............................. 23/270.5, 196/14.52
[51] Int. Cl............................................ B01d 11/04
[58] Field of Search...23/267 R, 270.5, 310, 267 MS, 23/220; 196/14.52

[56] References Cited
UNITED STATES PATENTS

| | | | |
|---|---|---|---|
| 2,084,342 | 6/1937 | Houghton | 23/270.5 |
| 2,192,094 | 2/1940 | Moore | 23/270.5 |
| 2,594,675 | 4/1952 | Norell | 23/270.5 |
| 2,682,453 | 6/1954 | Holder | 23/270.5 |
| 2,754,179 | 7/1956 | Whatley | 23/270.5 |
| 3,034,867 | 5/1962 | Samuelsen | 23/270.5 |
| 3,162,510 | 12/1964 | Meissner | 23/267 R |
| 3,206,288 | 9/1965 | Hazen | 23/270.5 |
| 3,323,865 | 6/1967 | Michener | 23/267 MS |
| 3,325,255 | 6/1967 | Treybal | 23/270.5 |
| 3,362,791 | 1/1968 | Ryon | 23/267 R |
| 3,489,526 | 1/1970 | El-Roy | 23/270.5 |

*Primary Examiner*—Norman Yudkoff
*Assistant Examiner*—S. J. Emery
*Attorney, Agent, or Firm*—Toren, McGeady and Stanger

[57] ABSTRACT

A device for contacting two immiscible liquids or liquids which never form a homogeneous phase includes a vessel having four exterior walls and a plurality of interior compartments which are divided by transverse and longitudinally extending partitions to form rows of alternately arranged mixing and settling chambers from one side of the vessel to the other. The vessel includes an inlet for a heavier liquid at one side and an inlet for a lighter liquid at the opposite side, the heavier liquid being admitted to a first stage mixing chamber and the lighter liquid being admitted to a last stage mixing chamber. Each mixing chamber contains a rotatable stirrer having an impeller which acts to direct the liquid downwardly and to pressurize it for transfer from the associated mixing chamber through a conduit or passage at the lower end of the mixing chamber into an adjacent settling chamber arranged in the same row. The lighter liquid is permitted to overflow at an overflow opening adjacent the upper portion or top of the settling chamber and in this first stage a portion of the lighter liquid is withdrawn and the heavier liquid is permitted to overflow at an overflow basin located below the overflow for the lighter liquid and directed into a second stage mixing chamber. The same procedure is effective from the last stage mixing chamber in respect to a settling tank arranged in the same row as the last stage mixing chamber, but the overflow in the settling tank at this location is for the heavier liquid which is withdrawn at such stage. The flow proceeds in a counterflow manner from the last stage toward the first and the first stage toward the last between mixing chamber to settling tank in a counter flow manner.

8 Claims, 11 Drawing Figures

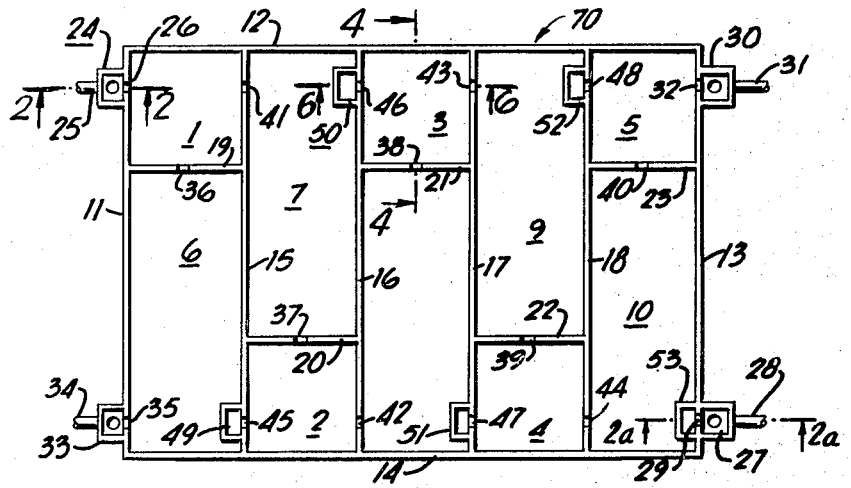
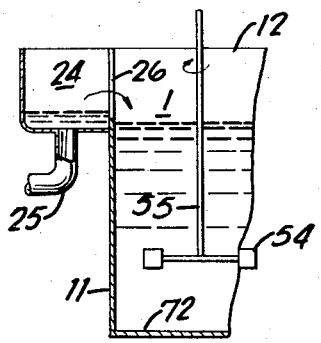
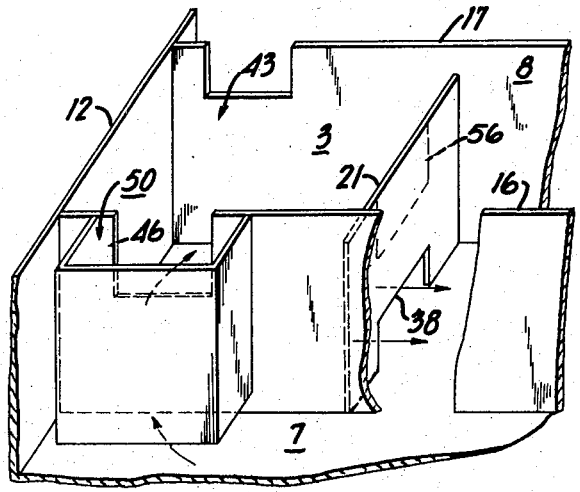
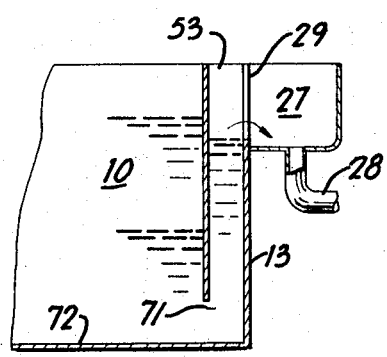
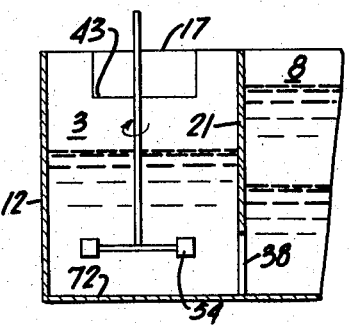

INVENTORS
SHIGERU TAKAHATA
MITSUHIRO SUEMURA
MASARU NOGUCHI
KENJI OHDAN

BY McGlew & Toren
ATTORNEYS

MULTI-STAGE COUNTER-CURRENT LIQUID-LIQUID CONTACT APPARATUS

This is a continuation of application Ser. No. 24,991 filed Apr. 2, 1970, now abandoned.

SUMMARY OF THE INVENTION

This invention relates in general to liquid contacting apparatus, and in particular to a new and useful liquid-liquid contact apparatus of the counter current contact type which includes an arrangement of mixing and settling tanks employed for the purpose of contacting two immiscible liquids or liquids which never form a homogeneous phase.

Numerous attempts have been made to design apparatus of the type which is provided by the present invention, for example, as defined in U.S. Pat. Nos. 2,682,453; 3,206,288; and which is described in a publication by Chemical Engineering Progress, Volume 50, No. 8 on pages 403 to 406. The process described in U.S. Pat. No. 2,682,453 is in respect to an air tight system which includes a plurality of contact chambers each one arranged a little lower than the next adjacent one, thereby permitting a gravitational flow of the liquid of higher density, that is, the heavier liquid to take place from the highest stage to the lowest stage, while the liquid of lower density, that is, the lighter liquid is pushed up by the heavier liquid from the lowest stage to the highest stage. With such an arrangement, no special conveying device such as a pump need be placed in each stage as is the usual case for the purpose of bringing about a counterflow of the heavier and lighter liquids. However, it has a great disadvantage in that the apparatus must be gas tight and it must also be located on an inclined floor or one which is specially designed for this purpose. The apparatus, which is described in the U.S. Pat. No. 3,208,288 can be placed on a horizontal floor but in order to have the liquids flow from the mixing chamber to the settling chamber each stage must be provided with some pumping device such as an air lift. The apparatus described in the Chemical Engineering Progress publication is one of the mixer-settler type in which neither pumps nor height differences between stages for the transfer of liquids is required because the system uses rotatable impellers which have a pumping action. In this arrangement the lighter liquid is transferred to the mixing chamber by its own overflow and the heavier liquid by the suction of the impeller arranged in each of the stages so that an extreme precision is required in respect to the performance of each impeller. If the impeller action is not uniform, the flow rate of the heavier liquid may vary from stage to stage and result in the rising or lowering of the interface defined between the lighter and heavier liquids in each settling chamber. This affects the flow rate of the lighter liquid. Therefore, the flow rate of the lighter and heavier liquids cannot be kept uniform throughout the apparatus even if various controlling means are provided. Consequently, a great deal of care and high degree of skill are required for the operation of such an apparatus.

In accordance with the present invention, there is provided a multi-stage counter-current liquid-liquid contact apparatus which can be operated with ease and which includes an arrangement in which the flow of both the lighter and the heavier liquids can always be kept uniform throughout the apparatus. In the preferred form the apparatus comprises a plurality of mixing chambers and settling chambers arranged alternately side by side. Each of the mixing chambers is equipped with a mixer in the form of a rotatable stirrer having an impeller which preferably acts to direct the mixture downwardly. Each mixing chamber is provided with an overflow inlet for the lighter liquid adjacent its top and another overflow inlet somewhat lower than the lighter liquid inlet for the heavier liquid. In addition, it includes a third passage at its bottom for the discharge of the mixture of the lighter and heavier liquids into a settling chamber located adjacent the mixing chamber. Each of the settling chambers includes walls forming the chamber which include a top overflow outlet for the lighter liquid and another adjacent the top but somewhat lower than the lighter liquid outlet for the heavier liquid. This overflow outlet is connected to the next mixing chamber stage. Each settling chamber also includes a passageway at the bottom for the feeding of the lighter and heavier liquids from the previous mixing step.

Accordingly, it is an object of the invention to provide a mixer-settler apparatus which includes a plurality of alternately arranged and interconnected mixing and settling chambers and wherein the mixing chambers each include a rotatable element such as a stirrer for pressurizing the mixed liquids and an inlet for one of the liquids adjacent the top thereof and a passage adjacent the bottom thereof for the outflow of the mixture under the action force of the stirrer as well as an overflow inlet for the other liquid at the top thereof, and wherein the settling chambers include outlet means for withdrawing the lighter and heavier liquids separately at two vertically spaced outlet locations adjacent the top thereof.

A further object of the invention is to provide a multi-stage counter-current liquid-liquid contact apparatus which can be operated with ease and in which the flow of both the lighter and heavier liquids can be kept uniform throughout the apparatus and wherein the apparatus advantageously includes a vessel which is divided by longitudinal and transverse partition walls into rows of alternately arranged mixing and settling tanks which are interconnected for the counter flow interchange of heavier and lighter liquids.

A further object of the invention is to provide a liquid-liquid contact apparatus which is simple in design, rugged in construction, and economical to manufacture, and which may be operated very easily.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 1 is a diagrammatic plan view of the general assembly of the apparatus of the invention for carrying out a liquid-liquid counter-current contact for a five stage system;

FIG. 2 is a section taken along the line 2—2 of FIG. 1;

FIG. 2a is a section taken along the line 2a—2a of FIG. 1;

FIG. 3 is a partial top perspective view showing the third stage mixing chamber and the associated settling chambers connected thereto;

FIG. 4 is a section taken on the line 4—4 of FIG. 1;

GENERAL DESCRIPTION OF THE PREFERRED EMBODIMENTS

Figure 5:
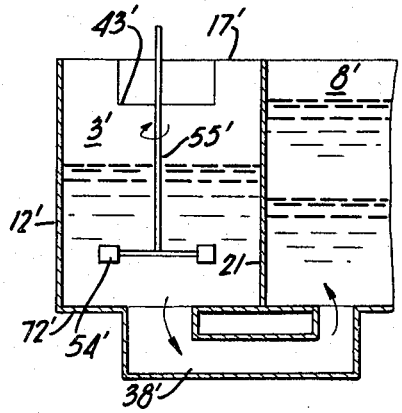
FIGS. 5 and 5a are sectional views similar to FIG. 4 of distinct embodiments of the invention.

Referring to the drawings in particular, the invention embodied therein, in FIGS. 1, 2a, 3, 4, and 6 comprises a five stage system which is formed in a container or vessel generally designated 70 which includes exterior side walls 11 and 13 and exterior end walls 12 and 14 and a bottom 72. The interior of the vessel 70 is divided into five separate mixing chambers 1, 2, 3, 4, and 5 which are alternately arranged in adjacent rows at respective opposite ends of the vessel. The vessel 70 is divided by longitudinal partition walls 15, 16, 17, and 18 and by transverse partition walls 19, 20, 21, 22, and 23 into transverse rows, each of which includes a mixing chamber 1, 2, 3, 4, and 5 and each of which includes a settling chamber 6, 7, 8, 9, and 10. The settling chambers 6 to 10 are alternately arranged from row to row adjacent a respective end 12 or 14 alternatively with the associated mixing chambers.

In accordance with the invention the vessel 70 is provided with an inlet 24 at the side wall 11 for the heavier liquid which is fed through an inlet pipe 25 to an inlet chamber 24 which has an overflow inlet 26 which leads into the first stage mixing chamber 1. The wall 13 at the opposite side is provided with an outlet 27 and a heavier liquid flows through a bottom opening 71 and upwardly in a passage 53 and over a damming wall portion of the wall 13 through an opening 29 adjacent the top of the vessel and into the outlet 27 for flow off through a conduit 28.

The wall 13 also includes an inlet part 30 for the lighter liquid which is equipped with an inlet pipe 31 and an overflow 32 for flow of the lighter liquid into the fifth stage mixing chamber 5.

The lighter liquid may be removed from the first stage settling tank 6 through an outlet 33 which receives liquid from an overflow passage 35 and delivers it through a conduit 34 for removal.

As best seen in FIGS. 1, 3 and 4, each transverse wall 19, 20, 21, 22 and 23 is provided with passages 36, 37, 38, 39 and 40 respectively, which are located adjacent the bottom and which separate the mixing chambers from the settling chambers in the respective stages as indicated. A mixture of the lighter and the heavier liquids which is mixed by stirring in each mixing chamber is conducted under pressure to the respective settling chambers through these passages.

FIG. 5 shows an alternate embodiment of the construction of the mixed liquid passages at the lower end of the connection between a stage of a mixing chamber and a settling chamber and, in this arrangement, a conduit 38' extends below the bottom 72' to permit forced flow of the liquid under the influence of a rotatable stirrer 55' having an impellor 54' to cause mixing and flow from the mixing chamber 3' of the third stage to a settling tank 8' associated with this stage.

Figure 5A:
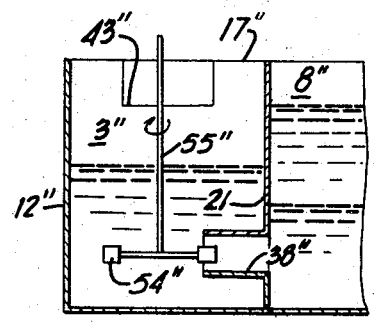

In the alternate embodiment illustrated in FIG. 5a a stirrer 55'' includes a rotor 54'' which moves through a path located at the entrance to a connecting conduit 38'' so that the mixed liquids may be conducted under pressure from the mixing chamber 3'' into the settling tank 8''.

Overflow outlets for the lighter liquid are located in longitudinal walls 15, 16, 17, and 18 at locations 41, 42, 43 and 44 respectively. These overflow outlets are located adjacent the top of the associated partition walls which separate each of the mixing chambers from the settling chamber of the adjoining stage. Through these outlets the lighter liquid overflows from each of the settling chambers into each of the associated mixing chambers.

Overflow outlets 45, 46, 47, and 48 are provided for the heavier liquid and they are similar to the construction of the overflow inlet 26 as seen in FIG. 2 for the overflow inlet part 24. These outlets 45, 46, 47, and 48 are located in respective longitudinal walls 15, 16, 17, and 18 which separate each of the mixing chambers from the settling chamber of the respective adjoining stages. Ducts 49, 50, 51, 52 and 53 for the heavier liquids surround the overflow outlets and they are provided at their lower ends with passages through which they open into the bottom of the respective settling chambers. The heavier liquid overflows from the settling chamber into the mixing chamber of the next adjacent stage. The lighter liquid overflow outlets are located a little higher than the heavier liquid overflow outlets but the lighter liquid overflows 35, 41, 42, 43, 44 and 32 are located in respect to each other at approximately the same height and this is also true of all of the heavier liquid overflows 26, 45, 46, 47, 48, and 29.

As best seen in FIG. 2, each of the mixing chambers 1, 2, 3, 4 and 5 is equipped with a stirrer 55 having a revolving impeller 54. The lighter and the heavier liquids after being mixed with the stirrer in the mixing chamber are sent by the action of the impeller 54 to the settling chamber of the same stage. For this reason it is advisable that the mixer impeller 54 include downwardly directed blades if the passage through which the mixed liquids are sent from the mixing chamber into the settling chamber is as shown in FIGS. 4 and 5. A turbine like impeller 54'' is advantageously employed as indicated in FIG. 5a, when the difference in density between the lighter liquid and the heavier liquid is great.

The operation of the device is as follows:

The heavier liquid which is introduced through the inlet part 24 moves through the pipe 25 and overflow inlet 26 into the mixing chamber 1 on the first stage where it is well mixed by means of a mixer with the lighter liquid which is fed to the overflow inlet 41. The lighter liquid is introduced into the entire system through the inlet part 30 at the side wall 13 and it will flow in counterflow relationship to the heavier liquid which is introduced at the opposite side wall 11. The mixture in the mixing chamber 1 is conducted through the passage 36 located at the bottom of the partition wall 19 into the settling chamber 6 where the mixture is separated into two phases by the difference in density of the two liquids. The lighter liquid is led out through the overflow conduit 35 and flows outwardly through the conduit 34.

The heavier liquid rises in the duct 49 which is located on the partition wall 15 and it flows through the overflow outlet 45 into the mixing chamber 2 of the second stage.

The lighter liquid which is introduced at the side wall 13 through the conduit 31 flows through the passage 32 into the mixing chamber 5 of the fifth stage where it is well mixed by means of the mixer therein with a heavier liquid which has been led through the overflow inlet 48 in the wall 18, having risen in the duct 52 attached to the settling chamber 9. The mixture of these two liquids is led from the mixing chamber 5 of the fifth stage through the passage 40 at the bottom of the partition wall 23 into the settling chamber 10 where the mixture is separated into two phases. The heavier liquid rises in the duct 53 and overflows through the overflow outlet 29 to the outlet part 27 and then through the outlet pipe 28 and it is taken out of the system. The lighter liquid flows through the overflow outlet 44 into the mixing chamber 4 of the fourth stage.

Figure 6:
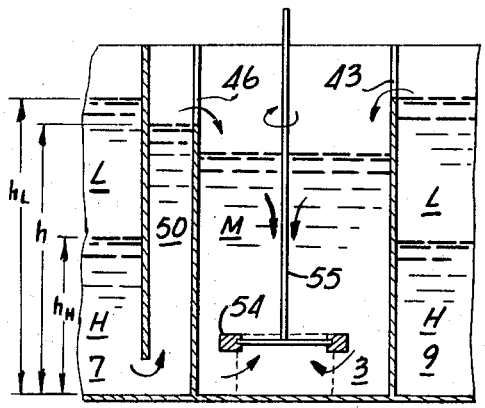
FIG. 6 is a section taken along the line 6—6 of FIG. 1.

Referring in particular to FIG. 6, which shows a sectional view of the mixing chamber 3 of the third stage, the liquids in the settling tanks 9 and 7 are designated L for the lighter liquid and H for the heavier liquid. In the mixing chamber 3, the mixture of the lighter and heavier liquids is designated by the letter M. If the density of the lighter liquid is represented by $p_L$ and that of the heavier liquid by $p_H$ then the height of the liquid surface in the settling chamber 7 will be equal to $h_L$. The height of the interface between the lighter and the heavier liquids equals $h_H$ and the height of the liquid in the overflow outlet 46 is equal to h. Therefore, it follows that $h \cdot p_H = (h_L - h_H)p_L + h_H \cdot p_H$.

From the equation it is clear that when $p_H$ and $p_L$ are given, then the dimension $h$, $h_L$ and $h_H$ can be chosen at will so long as these values satisfy the above equation.

FIG. 6 also shows how the liquids are transferred by the operation of the mixer 55. Once the mixer is in motion the mixed liquids M in the mixing chamber 3 is conducted under pressure through the passage 38 as indicated in FIGS. 1 and 4 and into the settling chamber 8 so that the level of the mixture in the mixing chamber is reduced downwardly below the overflow outlet 46. As a consequence the heavier liquid overflows into the mixing chamber through the outlet part 50 and the overflow outlet 46 and the lighter liquid also flows into the mixing chamber 3 through the overflow outlet 43 on the wall 17.

Figure 7:
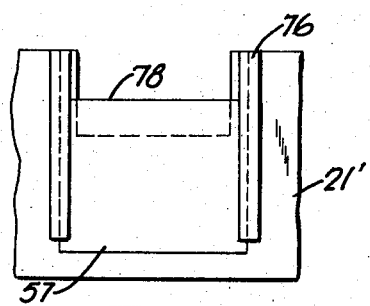
FIGS. 7 and 8 are enlarged partial elevational views of the upper portion of various embodiments of partition walls.

If the overflow outlets such as an overflow outlet 56 which is shown in dotted lines on the partition wall 21 in FIG. 3, are made a little lower than the lighter liquid overflow inlets which are at the top of the respective partition walls 19, 20, 21, 22, and 23 so that a part of the lighter liquid in the settling chamber may be made to flow backwardly into the mixing chamber (for example, from the settling chamber 8 backwardly into the mixing chamber 3) then the efficiency of the apparatus of the invention may be improved. As shown in FIG. 7, the overflow outlets may be formed like an adjustable gate 57 arranged in a wall 21' and which may be slid in guideways 76 for the purpose of locating the overflow edge 78 at a location to control the ratio of the backflow in accordance with operating experience.

Figure 8:
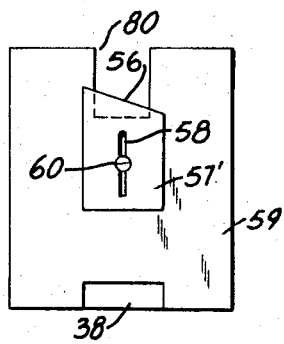

In an alternate embodiment of construction FIG. 8 indicates a wall or plate 59 which is made with a clamp 60 for an adjustable plate 57', having a vertical slot 58 to facilitate its adjustment. The plate 57' closes a portion of an opening 80 formed in the wall 59 in order to regulate the position of an overflow edge 56.

Figure 9:
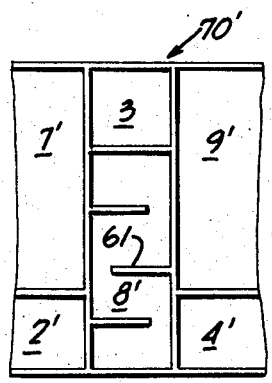
FIG. 9 is a partial top plan view of another embodiment of the invention.

In FIG. 9, there is shown a partial top plan view of an alternate embodiment of vessel 70' which includes at least one settling chamber 8' having a plurality of longitudinally spaced and laterally offset baffles 61 which help to promote the settling into the lighter and heavier liquid phases. Any number and arrangement of baffles may be provided in order to achieve a desired result in this respect. Any means for permitting the adjustment of the overflow levels of the various heavier and lighter liquids such as the devices used in FIGS. 7, 8, and 9 will of course make it easier to provide a greater variation of the treatment conditions and the handling or treating liquids of a larger variety of densities.

By using the apparatus of the invention, the following advantages may be obtained: In the multi-stage apparatus of the invention, it is not always necessary for the efficiency of the mixers which are installed in the mixing chambers to be of uniform construction. The flow rates of the lighter and the heavier liquids between every pair of stages will be kept constant throughout the apparatus so long as the efficiency of each of the mixers does not vary to any great extent. Furthermore the height of the interface of the lighter and the heavier liquids in each of the settling chambers is determined by the densities of the two liquids according to the equation given above regardless of the flow rates of the lighter and the heavier liquids. In addition the flow rates of the two liquids can be changed or adjusted at will while the apparatus is in operation without creating any disturbance on the stationary state once it is established. These characteristics are especially advantageous in the operation of an apparatus with tens and hundreds of stages.

Because of the simple nature of the construction of the inventive device, the apparatus has little chance of being subject to damage and it can be made of materials which will not require precision workmanship. The apparatus can be installed with great ease and does not occupy much space. Any arrangement of rows of mixing chambers and settling chambers may be provided and the size and number of the various stages may be expanded or contracted within the frame work of the inventive concepts without any difficulty.

What is claimed is:

1. A multi-stage counter-current liquid-liquid contact apparatus comprising a multi-stage container consisting of a bottom, a first end wall and a second end wall spaced from said first end wall and said first and second end walls extending upwardly from said bottom, and a first side wall and a second side wall spaced from said first side wall and said first and second side walls extending upwardly from said bottom and extending between said end walls, a plurality of laterally spaced longitudinal partition walls extending between said first and second end walls and dividing the space bounded by said bottom, said end walls and said side walls into a plurality of liquid-liquid contact stages, a plurality of transverse partition walls each located within a different one of the stages and extending transversely of and between said longitudinal partition walls and dividing each stage so that it consists of a mixing chamber and a settling chamber, within each pair of adjacent stages said mixing chamber in one of the stages extends from said first end wall to said transverse partition walls within the stage with said settling chamber extending from said transverse partition walls to said second end wall and said mixing chamber in the other one of the pair of adjacent stages extends from said second end wall to said transverse partition wall with said settling chamber in said stage extending from said transverse partition wall to said first end wall so that along each said first and second end walls said mixing chambers and settling chambers in adjacent stages are arranged in an alternating arrangement, first inlet means for supplying a first liquid into said mixing chamber located in the stage adjacent said first side wall, second inlet means for supplying a second liquid which is lighter than the first liquid into said mixing chamber located in the stage adjacent said second side wall, a first outlet means for withdrawing said first liquid from said settling chamber located in the stage adjacent said second side wall, a second outlet means for withdrawing the second liquid from said settling chamber located in the stage adjacent said first side wall, each of said mixing chambers which is located between a pair of said settling chambers in adjacent stages is arranged to receive separate flows of the first and second liquids directly from said settling chambers in the adjacent stages and has an overflow inlet for the lighter second liquid in the one of said longitudinal partition walls defining one side of said mixing chamber and another overflow inlet for the heavier first liquid in said longitudinal partition wall defining the opposite side of said mixing chamber, means forming an upwardly extending duct in each said settling chamber with the lower end of said duct adjacent said bottom of said container being open for admitting the heavier first liquid thereto and the upper end of said duct located adjacent and above one of said another overflow inlet for the heavier first liquid to the adjacent said mixing chamber or said first outlet means for the first liquid, said duct laterally separating one of said another overflow inlets for the heavier first liquid directly into the adjacent said mixing chamber or said first outlet means for the first liquid from the body of lighter and heavier liquid within said settling chamber, the overflow inlet for the heavier first liquid is located below said overflow inlet for the lighter second liquid and above the level of the mixture within said mixing chamber with said overflow inlets for the first and second liquids arranged so that the equation $h \cdot p_H = (h_L - h_H) p_L + h_H \cdot p_H$ is satisfied, where $h$ denotes the height of the heavier liquid in said ducts extending between the bottom of said container and the one of said overflow inlets for the heavier first liquid or said first outlet means for the heavier first liquid, $p_H$ denotes the density of the heavier first liquid, $h_L$ denotes the height of the liquid surface in the settling chamber, $h_H$ denotes the height of the interface between the heavier first liquid and the lighter second liquid in said settling chamber, and $p_L$ denotes the density of the lighter second liquid, means forming a discharge passage at the bottom of said container between said mixing chamber and settling chamber in the same stage, mixing means located within each of said mixing chambers and comprising an impeller having blades for imparting a mixing action throughout the full height of the mixture of the first liquid and the second liquid contained within the space in each stage forming said mixing chamber, each said impeller is located adjacent the bottom of the container within said mixing chamber within which it is located for mixing the first and second liquids and for directing the mixture through said discharge passage into said settling chamber in the same stage with said mixing chamber, and each said discharge passage being located substantially below the level of the interface between the heavier first liquid and a lighter second liquid in said settling chamber to which said discharge passage opens.

2. A multi-stage counter-current liquid-liquid contact apparatus, as set forth in claim 1, wherein said means forming the discharge passage comprises an opening in each said transverse partition wall adjacent said bottom of said container.

3. A multi-stage counter-current liquid-liquid contact apparatus, as set forth in claim 2, wherein said impeller for mixing the first and second liquids comprises a single rotatable blade structure positioned within said mixing chamber at the level of said discharge passage for directing the mixture through said discharge passage.

4. A multi-stage counter-current liquid-liquid contact apparatus, as set forth in claim 2, wherein said impeller for mixing the first and second liquids comprises a single rotatable blade structure positioned within said mixing chamber at the level of said discharge passage and with a portion of said blade structure extending into said discharge passage as it is rotated.

5. A multi-stage counter-current liquid-liquid contact apparatus, as set forth in claim 1, wherein said means forming the discharge passage comprising walls forming a passageway located below said bottom of said container and connected at one end through said bottom to one said mixing chamber and at its opposite end to said settling chamber in the same stage as said mixing chamber to which the one end is connected.

6. A multi-stage counter-current liquid-liquid contact apparatus, as set forth in claim 5, wherein said impeller means for mixing the first and second liquids comprises a single rotatable blade structure positioned within said mixing chamber above the opening into said discharge passage.

7. A multi-stage counter-current liquid-liquid contact apparatus, as set forth in claim 1, wherein each said settling chamber includes at least one baffle spaced from said transverse partition wall and attached along one edge to one said longitudinal partition wall and having the other edge spaced from said longitudinal partition wall on the opposite side of said settling chamber.

8. A multi-stage counter-current liquid-liquid contact apparatus, as set forth in claim 1, wherein each said transverse partition wall has an overflow inlet for flowing the lighter second liquid from said settling chamber to said mixing chamber in the same stage.

* * * * *

UNITED STATES PATENT OFFICE
CERTIFICATE OF CORRECTION

Patent No. 3,844,723                    Dated October 29, 1974

Inventor(s) Shigeru Takahata, Mitsuhiro Suemura, M. Noguchi, K. Ohdan;

It is certified that error appears in the above-identified patent and that said Letters Patent are hereby corrected as shown below:

In the heading of the patent, change:

"[75]   Inventors: Shigeru Takahata; Mitsuhiro Suemura; Masaru Noguchi; Kenji Ohdan, all of Takefu, Japan"

to

--[75]   Inventors: Shigeru Takahata; Mitsuhiro Suemura; Masaru Noguchi; Kenji Ohdan, all of Takefu-shi, Fukui-ken, Japan--

Signed and sealed this 24th day of December 1974.

(SEAL)
Attest:

McCOY M. GIBSON JR.                C. MARSHALL DANN
Attesting Officer                  Commissioner of Patents